Sept. 12, 1933.　　　　W. L. PIPES　　　　1,926,310
TIRE EXPANDING AND BAGGING MECHANISM
Filed March 12, 1930　　　3 Sheets-Sheet 2
Fig. 2
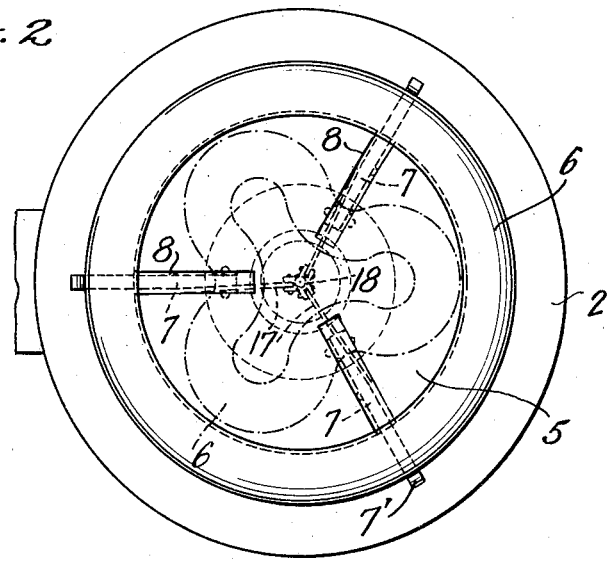
Fig. 4.
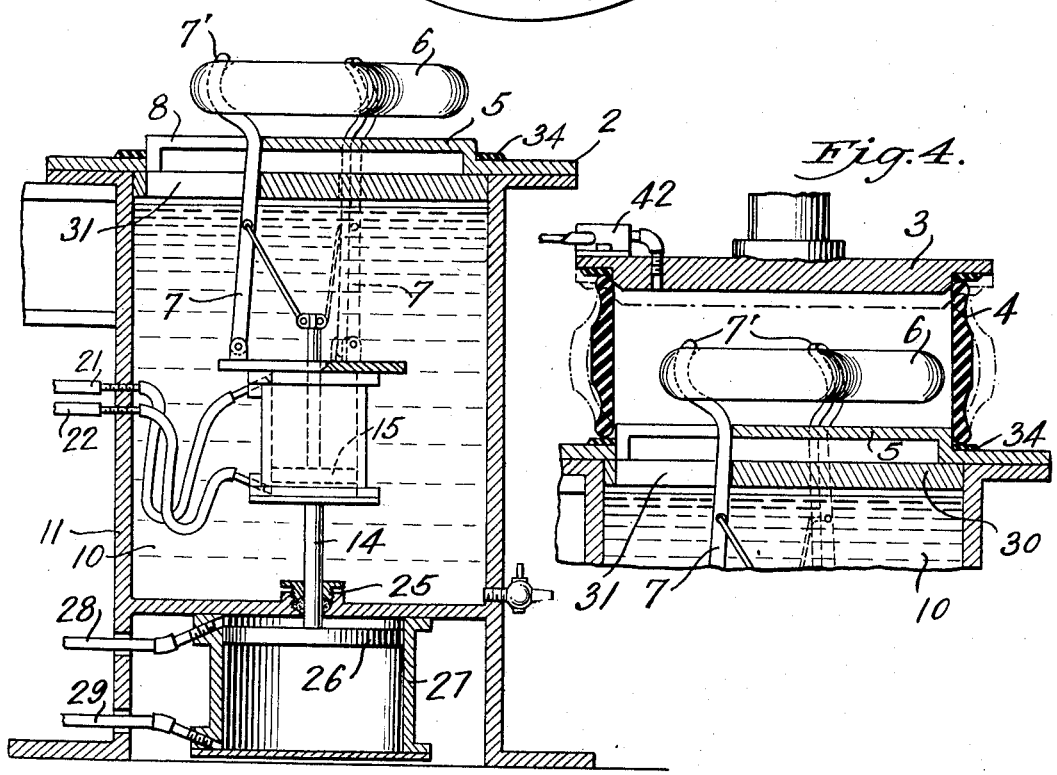
Fig. 3.
INVENTOR
Walter L. Pipes

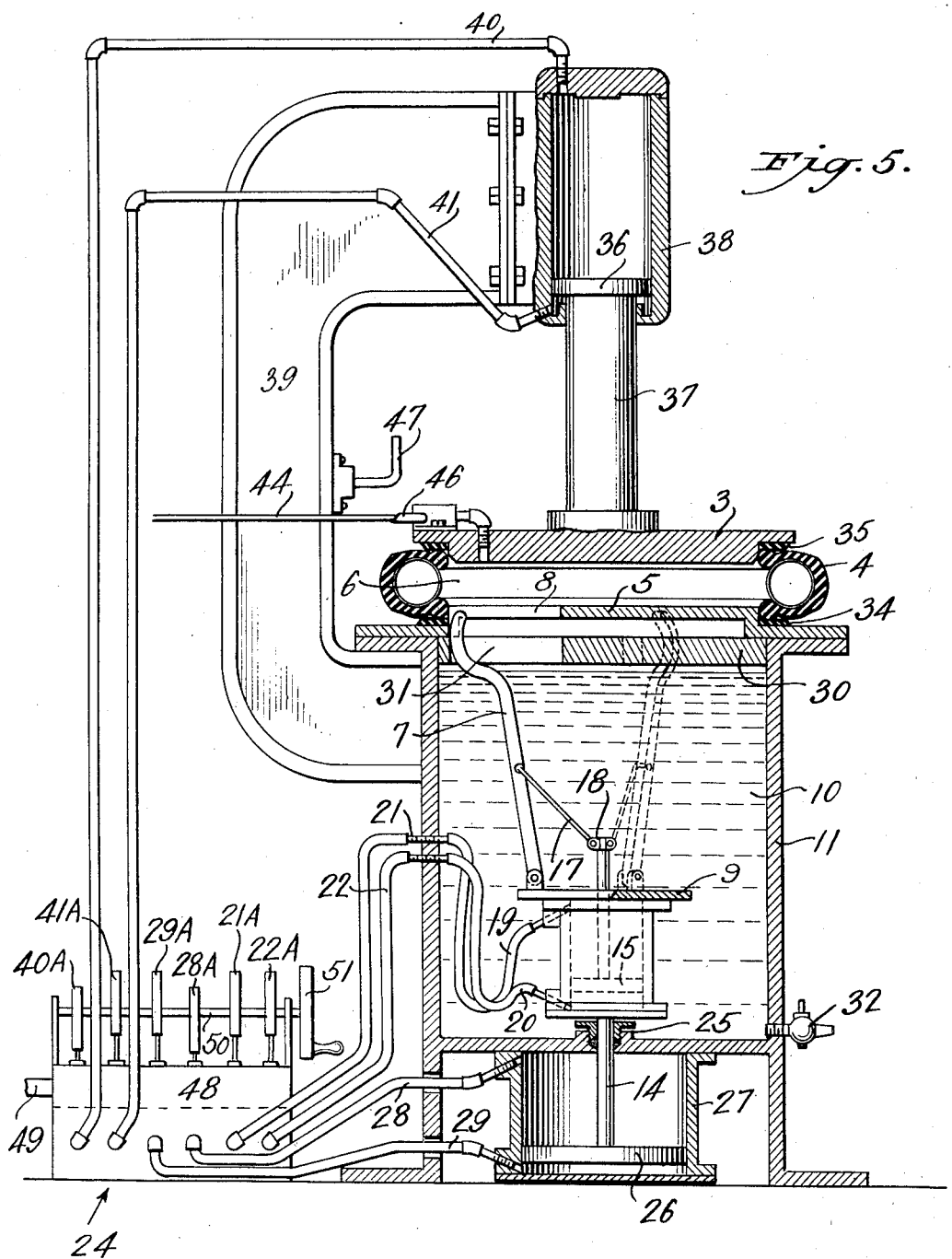

Patented Sept. 12, 1933

1,926,310

UNITED STATES PATENT OFFICE 1,926,310

TIRE EXPANDING AND BAGGING MECHANISM

Walter L. Pipes, Elizabeth, N. J., assignor to Morgan & Wright, Detroit, Mich., a corporation of Michigan Application March 12, 1930. Serial No. 435,115

11 Claims. (Cl. 18—2)

My invention relates to tire expanding and bagging mechanisms and more particularly to a machine for collapsing an air bag from an expanded position to a collapsed position within the area circumscribed by a tire band being shaped by the mechanism.

In shaping tires from so-called flat or pulley bands, it has heretofore been customary to place the edges of said band in engagement with relatively movable shaping members or platens. Upon the approach of the shaping members the band bulges into the general shape of a tire carcass. Differential fluid pressure is applied to the opposite faces of the band for aiding in the shaping operation. Such differential pressure may be secured by subjecting the outer surface of the tire to the action of a vacuum, or the differential pressure may be applied by the application of fluid under pressure to the interior to the band. The present invention relates particularly to the class of mechanisms in which fluid pressure is applied internally of the bands, although it is to be understood that certain of the features of the invention are applicable to a vacuum applying mechanism.

After the shaping of the tire band has taken place, it has heretofore been customary to remove the shaped band and insert an air bag which is used in the vulcanizing operation. The insertion of such air bags by hand is a laborious operation requiring the expenditure of considerable physical labor. Attempts have also been made to insert a collapsed air bag after the tire has been shaped but before it is removed from the engagement with the shaping members. In such cases, however, it has been necessary to provide separate mechanism for collapsing the air bag and further mechanism for feeding it to the tire band.

I provide a tire shaping mechanism in which the air bag in an expanded condition is applied to one of the shaping members receiving the tire band. The air bag is collapsed and held in operative relation to the member while the tire band is placed thereon. At any time during the shaping operation of the band the air bag may be released. When the air bag is released before the shaping operation is completed, its expansive force assists the differential pressure applied to the faces of the band in shaping the band. In the present invention I have shown the differential pressure as being applied by the application of fluid pressure internally to the tire band, although the operation of the air bag collapsing and manipulating mechanisms may be used with a vacuum apparatus.

In order to permit the expansion of the air bag and secure its nesting in the tire band, the air bag manipulating mechanism is withdrawn through openings in the shaping member. To preserve the differential pressure between the faces of the tire band it is necessary to close the openings in the member through which the manipulating mechanism is withdrawn. This is accomplished by providing a fluid tight housing which serves as a support for the member and into which the manipulating mechanism is withdrawn. In order that the volumetric capacity of the housing shall not materially affect the differential pressure applied to the pulley band, the housing is preferably filled with a substantially incompressible fluid such as water or oil.

The accompanying drawings illustrate a present preferred embodiment of the invention, in which Figure 1 is a view partially in elevation and partially in section of a mechanism embodying my invention;

Fig. 2 is a broken plan view of the mechanism taken substantially along the section line 2—2 of Fig. 1;

Fig. 3 is a sectional view of a portion of the mechanism showing the air bag in the collapsed position;

Fig. 4 is a sectional view of a portion of the mechanism showing the relative positions of the collapsed air bag and tire band when the latter is positioned in the mechanism; and Fig. 5 is a view similar to Fig. 1 showing the mechanism in substantially the final tire shaping position.

Figure 1:
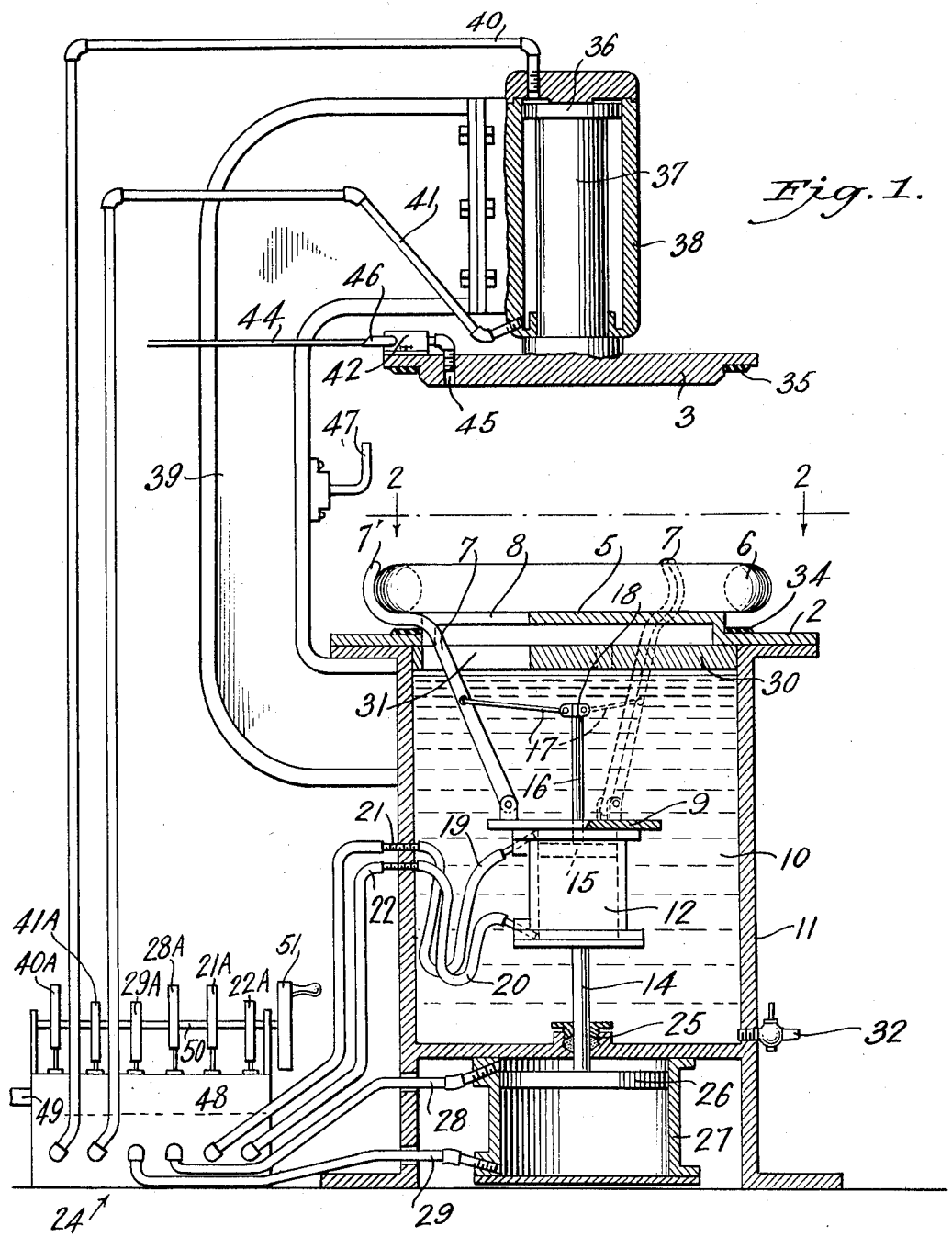

Referring to the drawings, a tire shaping mechanism embodying my invention comprises a pair of relatively movable shaping members 2 and 3 between which a tire band 4 may be positioned. The shaping member 2 is provided with a raised portion 5 which serves as a seat for an expanded air bag 6 when the latter is applied. Fingers 7 for engaging the outer periphery of the air bag 6 extend upwardly through slots 8 in the seat 5. Fingers 7 terminate in curved or hooked portions 7' which fit over the external surfaces of the air bag far enough to hold the air bag against jumping or buckling away from the fingers yet permit the withdrawal of the fingers from engagement with the air bag through the slots 8. The fingers 7 are pivotally mounted on a plate 9 carried within a liquid tight chamber 10 in the base 11 supporting shaping member 2.

The plate 9 constitutes a cylinder head for a cylinder 12 which is supported on a piston rod 14 within the chamber 10. A piston 15 within the cylinder 12 actuates a piston rod 16 for manipulating the fingers 7 through links 17 and a header 18. When the piston 15 is in its raised or upper position, the fingers 7 are expanded in a position to receive the expanded air bag if they are projecting above the seat 5. When the piston 15 is in its lower position the fingers are drawn inwardly to collapse and confine the air bag 6, as is shown in dotted lines in Fig. 2. In the collapsed position, the air bag assumes a looped position and is of less diameter than the diameter of the tire band 4 when applied to the shaping member 2, as is shown in Fig. 4.

Fluid for operating the piston 15 is supplied to the upper and lower ends of the cylinder 12 by flexible conduits 19 and 20, respectively. The conduits 19 and 20 are connected to pipe lines 21 and 22, respectively. The pipe lines 21 and 22 lead to a valve mechanism 24 which is hereinafter described.

The elevation and withdrawal of the fingers 7 through the seat 5 is controlled by the piston rod 14 supporting the cylinder 12. The piston rod 14 extends through a packing gland 25 at the bottom of the chamber 10 and is connected to a piston 26 movable in a cylinder 27. Fluid pressure is applied to the upper face of the piston 26 through a pipe line 28 leading to the valve mechanism 24. A corresponding pipe line 29 is connected to the lower portion of the cylinder 29 for applying pressure to raise the piston rod 14. Upon the application of fluid under pressure to the top of the piston 26, the piston rod 14 is lowered to withdraw the fingers 7 through the slots 8. Upon the application of fluid under pressure to the lower face of the piston 26, the piston rod 14 is raised to project the fingers 7 through the slots 8. Preferably, the area of the cylinder 26 should be greater than the area of the piston 15 so that when the same fluid pressure is applied to the pistons 15 and 26, the piston 26 will support the cylinder 12 and plate 9. A guide plate 30 having slots 31 in alignment with the slots 8 is mounted at the top of the chamber 10. The slots 31 serve as rests for the fingers 7 when the latter are in their retracted positions, as shown in Fig. 5. In order to provide a smooth working surface at the top of the shaping member 2, the connections between the member 2, the base 11 and the plate 30 are preferably welded.

In order that the volumetric capacity of the chamber 10 shall not be effective in controlling the pressure at the shaping chamber 2, the latter is preferably filled with an incompressible fluid, such as water, although oil may be used, if desired. A cock 32 is provided for withdrawing or admitting the fluid to the chamber 10. Were the chamber 10 left open in communication with the working surface of the shaping member 2, the volume of air entrapped in the chamber 10 would be so great as to materially affect the pressure differential which could be applied to the tire band 4 during the shaping operation. The shaping members 2 and 3 are provided with rings 34 and 35, respectively, of soft rubber which serve as seals for the reception of the edges of the tire band 4. The shoulder of the seat 5 substantially determines the size of the minimum tire which can be used on the machine, although by increasing the width of the rings 34 and 35 larger size tires can be handled.

The upper shaping member 3 is supported by a piston 36 and piston rod 37 working in a cylinder 38 carried by a bracket 39 fastened to the base frame 11. The upper and lower portions of the cylinder 38 are connected to the valve mechanism 24 by pipe lines 40 and 41, respectively. The pipe line 41 is normally connected to permit fluid under pressure to maintain the shaping member 3 in a raised position.

The shaping member 3 carries a valve mechanism 42 which is connected to a flexible pipe line 44 and to an opening 45 extending to the lower face of the shaping member 3.

A lever 46 engages a hook 47 carried by the bracket 39 for opening the valve 42 during the descent of the shaping member 3. During the descent the lever 46 engages the hook 47 to open the valve to permit fluid under pressure to move from the line 44 through the opening 45 to expand the tire. The lever 46 can slide past the hook 47 during the upward movement of the shaping member 3. The operation of the valve mechanism 42 is described in the patent to Hopkinson No. 1,713,658.

The valve mechanism 24 comprises a chest 48 to which a pipe 49 is attached for conveying fluid under compression to the chest 48. A shaft 50 is mounted above the chest and is operated by a handle 51. Cams 40a, 41a, 29a, 28a, 21a and 22a are mounted on the shaft 50 for controlling the admission of fluid to the pipe lines 40, 41, 29, 28 21 and 22. The details of the valve mechanism are such that the pipes are normally open to the air at times when they are not being utilized to convey fluid under pressure, which construction provides for the release of fluid from in front of the pistons 15, 26 and 36 during their movements. Normally, the valves 22a, 29a and 41a are slightly open to maintain the co-operating pistons in their raised positions.

In the operation of the machine, an expanded air bag 6 is placed in the fingers 7, as shown in Fig. 1. The piston 15 is then depressed by the turning of the cams 21a and 22a. The depression of the piston 15 causes the links 17 to draw the fingers 7 together which collapses the air bag, as shown in Figs. 2 and 3. A tire band is then placed on the ring 34 and the shaping member 3 is lowered to the position shown in Fig. 4. The position of the tire band is exterior to the collapsed air bag. Further downward movement of the shaping member 3 starts to bulge the tire band into the curved position shown in dotted lines in Fig. 4. At the same time air or other fluid under compression is admitted through the valve mechanism 42 for assisting in the shaping of the tire band. At any stage in the shaping operation the piston 15 may be raised to release the fingers 7 and permit the expansion of the air bag 6. At the same time the piston 26 is lowered to withdraw the fingers 7 through the slots 8 to free the air bag. The released air bag expands and engages the walls of the tire band and/or shaped carcass into which it nests. Preferably the air bag is released prior to the final shaping of the tire band in order to assist in the shaping thereof. As shown in Fig. 5, the shaped casing 4 is ultimately wrapped around the air bag 6 so that the assembled air bag and casing may be removed upon the lifting of the shaping member 3. After the finished casing and air bag are removed the fingers 7 are raised and spread to receive another expanded air bag.

The foregoing cycle of operations may be repeated rapidly by the manipulation of the crank 51 and without the expenditure of physical labor for manually buckling the air bag, or by the expenditure of time and energy in transferring a previously collapsed air bag from one machine to the expanding machine.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. In a tire shaping machine, a plurality of relatively movable shaping members for engaging the edges of a tire band, and pivotally mounted fingers extending thru one of said members and movable relatively thereto about their pivots for collapsing and releasing an air bag within a tire band positioned between the shaping members.

2. In a tire shaping machine, a plurality of relatively movable shaping members for engaging the edges of a tire band, pivotally mounted fingers extending thru one of said members and movable relatively thereto about their pivots for collapsing and releasing an air bag within a tire band positioned between the shaping members, and means for actuating said fingers for collapsing and releasing said bag.

3. In a tire shaping machine, a plurality of relatively movable shaping members for engaging the edges of a tire band, pivotally mounted fingers extending thru slots in one of said members and movable in said slots about their pivots for collapsing and releasing an air bag within a tire band positioned between the shaping members, and means comprising a movable base common to said fingers for actuating them to collapse and release said bag.

4. In a tire shaping machine, a shaping member for engaging an edge of a tire band, swinging means working thru openings in said member for collapsing and releasing an air bag associated therewith, and actuating mechanism for said means comprising a common base and a device for moving said means relative to the base for manipulation of the air bag.

5. In a tire shaping machine, a shaping member for engaging an edge of a tire band, pivoted fingers working thru slots in said member for collapsing and releasing an air bag associated therewith, actuating mechanism for said fingers comprising a common base and a device for moving said fingers relative to the base for manipulation of the air bag, and means for moving said base relative to said member to withdraw said working means thru said openings.

6. In a tire shaping machine, a shaping member for engaging an edge of a tire band, means extending through said member for manipulating an outer surface of an air bag, means for withdrawing said manipulating means to permit the release of said air bag, and a liquid tight casing for said member enclosing at least a part of said withdrawing means, said casing having a top for supporting said air bag which top is provided with openings for the manipulating means, whereby said casing may be filled with liquid so that pressures applied to said member for shaping a tire band are substantially unaffected by the volumetric capacity of said casing.

7. A tire shaping machine comprising a member for engaging an edge of a tire band, means for engaging another edge of a tire band, means for applying a differential pressure between the surfaces of said band, means insertable through and withdrawable from one of said members for manipulating an air bag while disposed in substantially a horizontal plane within the area circumscribed by a tire band mounted in the machine, and a fluid tight housing for at least a portion of said manipulating means, the interior of said housing being in communication with the outer surface of the member through which the manipulating means moves.

8. In a tire shaping machine, a fluid tight base for supporting a tire band during a shaping operation, pivotally mounted fingers projectable from said base for manipulating a curing bag, a common support for said fingers, means for moving said support to control the projection of said fingers, and means for causing angular movement of said fingers relative to said support.

9. In a tire shaping machine, a fluid tight base for supporting a tire band during a shaping operation, pivotally mounted fingers projectable from said base for manipulating a curing bag, a common support for said fingers and constituting a cylinder head, a cylinder associated therewith, a piston projecting from said support, connecting means between said piston and said fingers for moving the latter relative to said support upon the movement of said piston, and means for moving the cylinder and support to vary the projection of said fingers.

10. In a tire shaping machine, a fluid tight base for supporting a tire band during a shaping operation, pivotally mounted fingers projectable from said base for manipulating a curing bag, a common support for said fingers and constituting a cylinder head, a cylinder associated therewith, a piston projecting from said support, connecting means between said piston and said fingers for moving the latter relative to said support upon the movement of said piston, and a second cylinder and piston rod for moving the support and the first cylinder to vary the projection of the fingers.

11. In a tire shaping machine, a shaping member for engaging an edge of a tire band and supporting a curing bag in substantially horizontal position, means extending through said member for manipulating an outer surface of the curing bag within the area circumscribed by a tire band resting on said member, means for withdrawing said manipulating means to permit the release of said curing bag, and a liquid tight casing for enclosing at least a part of said withdrawing means and said manipulating means.

WALTER L. PIPES.